(12) United States Patent
Kolbe et al.

(10) Patent No.: US 11,827,160 B2
(45) Date of Patent: Nov. 28, 2023

(54) METHOD FOR PRODUCING A THREE-DIMENSIONAL MOTOR VEHICLE INTERIOR ELEMENT THROUGH WHICH LIGHT CAN SHINE, AND A MOTOR VEHICLE INTERIOR ELEMENT

(71) Applicant: Continental Automotive GmbH, Hannover (DE)

(72) Inventors: Alena Sina Kolbe, Seligenstadt (DE); Peter Bolte, Buseck (DE); Till Fiegler, Muenster (DE); Simon Hauck, Aschaffenburg (DE); Jochen Moeller, Darmstadt (DE)

(73) Assignee: Continental Automotive GmbH, Hannover (DE)

( * ) Notice: Subject to any disclaimer, the term of this patent is extended or adjusted under 35 U.S.C. 154(b) by 714 days.

(21) Appl. No.: 16/349,670

(22) PCT Filed: Dec. 12, 2017

(86) PCT No.: PCT/EP2017/082319
§ 371 (c)(1),
(2) Date: May 14, 2019

(87) PCT Pub. No.: WO2018/108861
PCT Pub. Date: Jun. 21, 2018

(65) Prior Publication Data
US 2019/0291659 A1    Sep. 26, 2019

(30) Foreign Application Priority Data

Dec. 13, 2016 (DE) ...................... 10 2016 224 879.0
Dec. 21, 2016 (DE) ...................... 10 2016 225 813.3

(51) Int. Cl.
*G08G 1/005* (2006.01)
*B60R 13/02* (2006.01)
(Continued)

(52) U.S. Cl.
CPC ............ *B60R 13/02* (2013.01); *B29C 67/246* (2013.01); *B60Q 3/00* (2013.01); *B60Q 3/14* (2017.02);
(Continued)

(58) Field of Classification Search
USPC ... 340/925, 934, 950, 952, 973, 991–995.11, 340/995.27, 995.28, 996
See application file for complete search history.

(56) References Cited

U.S. PATENT DOCUMENTS 6,570,056 B1 * 5/2003 Tanzer ............... A61F 13/49009
604/385.16
10,695,631 B2 * 6/2020 Morrow ............... D03D 13/004
(Continued)

FOREIGN PATENT DOCUMENTS

CN       104136232 A     11/2014
CN       105922941 A      9/2016
(Continued)

OTHER PUBLICATIONS

Chinese Office Action dated Sep. 1, 2020 for the counterpart Chinese Patent Application No. 201780076484.X.
(Continued)

*Primary Examiner* — Daniel Previl

(57) ABSTRACT

A method for producing a three-dimensional motor vehicle interior element through which light can shine and which has an observer-side surface is produced in two steps. In a first step a three-dimensional transparent substrate is produced from a cross-linked polymer. In a second step the substrate is provided on an observer-side surface of the substrate with a coloring through which light can shine, at least in a subregion.

12 Claims, 3 Drawing Sheets

(51) Int. Cl.
    B29C 67/24    (2006.01)
    B60Q 3/00     (2017.01)
    B60Q 3/14     (2017.01)
    B60Q 9/00     (2006.01)
    B29K 75/00    (2006.01)
    B29L 31/30    (2006.01)
    B29C 45/00    (2006.01)
(52) U.S. Cl.
    CPC ........ B60Q 9/00 (2013.01); *B29C 2045/0079* (2013.01); *B29C 2791/001* (2013.01); *B29K 2075/00* (2013.01); *B29K 2995/002* (2013.01); *B29K 2995/0026* (2013.01); *B29L 2031/3005* (2013.01); *B60R 2013/0287* (2013.01)

(56) References Cited

U.S. PATENT DOCUMENTS

| | | | | |
|---|---|---|---|---|
| 2007/0116607 | A1* | 5/2007 | Wang | B01L 3/502715 422/83 |
| 2009/0230878 | A1* | 9/2009 | Naito | H01L 33/04 315/291 |
| 2009/0279285 | A1* | 11/2009 | Nakayama | H05B 33/14 362/97.3 |
| 2012/0178844 | A1* | 7/2012 | Frey | G03F 7/031 522/8 |
| 2013/0186466 | A1* | 7/2013 | Hebrink | C12N 15/113 428/149 |
| 2014/0099826 | A1* | 4/2014 | Mueller | E06B 3/66309 439/625 |
| 2014/0261153 | A1* | 9/2014 | Mochizuki | G01D 11/28 116/28 R |
| 2014/0321136 | A1* | 10/2014 | Reuschel | B60Q 3/14 362/511 |
| 2016/0001584 | A1* | 1/2016 | Raksha | B05D 5/061 427/7 |
| 2017/0158108 | A1* | 6/2017 | Elbaz | B60P 3/0255 |
| 2017/0307909 | A1* | 10/2017 | Moeller | G02F 1/133711 |
| 2019/0291659 | A1* | 9/2019 | Kolbe | B60R 13/02 |

FOREIGN PATENT DOCUMENTS

| | | |
|---|---|---|
| DE | 3804619 A1 | 8/1989 |
| DE | 102004062510 A1 | 7/2006 |
| DE | 102006003170 A1 | 8/2007 |
| DE | 102009030684 A1 | 12/2010 |
| DE | 102012211951 A1 | 1/2014 |
| DE | 102014220348 A1 | 4/2016 |
| DE | 102016225813 A1 | 6/2018 |
| EP | 2676841 A1 | 12/2013 |
| WO | 2008008860 A2 | 1/2008 |
| WO | 2016193384 A1 | 12/2016 |

OTHER PUBLICATIONS

International Search Report and Written Opinion dated Feb. 7, 2018 from corresponding International Patent Application No. PCT/EP2017/082319.

Wikipedia "Optical bonding", https://en.wikipedia.org/w/index.php?title=Optical_bonding&oldid=1046430352, last edited Sep. 25, 2021, Jan. 2, 2022, 2 pages.

Transmittal and Third Party Observation for counterpart application No. EP20170822604, Feb. 7, 2022.

Wikipedia "Polyurethane", https://de.wikipedia.org/wiki/Polyurethane, Aug. 6, 2022.

Communication dated Oct. 17, 2022 from corresponding German patent application No. 10 2016 225 813.3.

Jens Mueller "Einteilung der Polyurethane und Anwendungsbeispiele" 2015.

"PUR(e) Vielfalt", Ruehl Puromer GmbH, 2015.

"Technische Information puroclear® 2380/80", Ruehl Puromer GmbH, 2015.

* cited by examiner

METHOD FOR PRODUCING A THREE-DIMENSIONAL MOTOR VEHICLE INTERIOR ELEMENT THROUGH WHICH LIGHT CAN SHINE, AND A MOTOR VEHICLE INTERIOR ELEMENT

FIELD OF THE INVENTION

The invention relates to a method for producing a three-dimensional motor vehicle interior element through which light can shine and which has an observer-side surface, wherein the motor vehicle interior element is produced in two steps. The invention also relates to a motor vehicle interior element which is designed such that it is three-dimensional and light can shine through it.

BACKGROUND

There is a known method such as that mentioned above in which depressions of a three-dimensional thermoformed translucent film of a tinted covering of an indicating device are filled with a so-called optical bonding material on the side facing away from an observer. The known method is laborious and, for example because of possible defects in the film and possibly insufficient contour trueness of the film, entails a risk of an undesirably high reject rate when producing corresponding motor vehicle interior elements.

SUMMARY

An object of the invention is to provide a simplified method of the type mentioned at the beginning for producing a motor vehicle interior element. Another object of the invention is to provide a motor vehicle interior element of the type mentioned at the beginning that can be produced in a simplified manner.

The first-mentioned object is achieved according to the invention in that, in the case of a method of the type mentioned at the beginning, in a first step a three-dimensional transparent substrate is produced from a cross-linked polymer and in that in a second step the substrate is provided on an observer-side surface of the substrate with a coloring through which light can shine, at least in a subregion.

It is of particular advantage in the case of the method according to the invention that a high contour trueness and good molding of edges of the three-dimensional motor vehicle interior element are achieved. Also, both the first step and the second step can be carried out in a single production tool. This can be made possible for example by means of a displacing and/or rotating device integrated in the production tool. It is also conceivable for it to be realized by means of withdrawing a tool core of the production tool. The second step, providing the coloring, follows the first step, producing the transparent substrate, preferably immediately thereafter.

The cross-linked polymer, which can generally also be referred to as a cross-linked plastic, is preferably a thermoset. In principle, the cross-linked polymer may however also be an elastomer, in particular a highly cross-linked elastomer.

Advantageously, the substrate may be produced from a thermoset, and the thermoset of the substrate is preferably a polyurethane.

The coloring through which light can shine is preferably a homogeneous coloring. With the coloring, for example a so-called disappearance effect can be achieved.

In particular, the coloring may be of a dark gray or black color, whereby a so-called black panel effect, a specific form of the aforementioned disappearance effect, can be advantageously achieved. With a black panel effect, the observer-side surface of the motor vehicle interior element appears dark when the lighting is switched off, which lighting is arranged for example in the motor vehicle interior element or for example on a rear side of the motor vehicle interior element that is facing away from an observer and by means of which light can shine through the motor vehicle interior element, whereas, when the lighting is switched on, which lighting has for example a light source arranged on a rear side of the motor vehicle interior element that is facing away from an observer, indicating symbols arranged for example within the motor vehicle interior element or behind the motor vehicle interior element, that is to say for example on its rear side, become visible.

When the motor vehicle interior element is fitted in a motor vehicle, the observer-side surface of the motor vehicle interior element is the surface on the vehicle occupant side. Consequently, the observer-side surface is facing a vehicle interior and an observer located in the vehicle interior, for example the driver of the motor vehicle in which the motor vehicle interior element is fitted.

Preferably, the observer-side surface of the motor vehicle interior element is of a plastic form, and the rear-side surface of the motor vehicle interior element that is facing away from the observer is preferably of a planar form. In the state in which it is fitted in a motor vehicle, the motor vehicle interior element may for example lie on an indicating device, for example a display.

The three-dimensional configuration of the motor vehicle interior element may for example be such that in its cross section the motor vehicle interior element varies in cross-sectional height between for example a minimum of 0.5 mm and a maximum of 10 mm. The three-dimensional configuration of the motor vehicle interior element can advantageously serve an operator as an ergonomic feeling aid and/or finger guide.

The method according to the invention can be advantageously used for producing a motor vehicle interior element through which light can shine that has three-dimensional structures of varying cross-sectional height, while transitions with respect to sudden changes in cross section can have very small cross-section radii, and at the same time has an optical disappearance effect and has a very high surface quality, which makes it possible for the motor vehicle interior element to be used as an indicating and/or operating element in a motor vehicle.

Additional advantageous developments of the invention are specified in the subclaims.

According to an advantageous development of the invention, the substrate is produced by mixing a first component and a second component. The mixed components are brought into a mold, and a chemical reaction of the components and curing take place, so that the substrate is formed. The mixing of the two components may be performed for example by means of a mixing head directly on the production tool for the motor vehicle interior element.

In principle, it is conceivable that the substrate consists for example of any desired transparent thermoset. However, it has proven to be particularly advantageous for the motor vehicle interior element and its use in a motor vehicle if, according to a development of the invention, the first component is a polyol and the second component is an aliphatic polyisocyanate and if the cross-linked polymer is a polyurethane produced by a reaction of the polyol and the polyisocyanate. The polyol may for example be a polyester polyol.

According to another advantageous development of the invention, the substrate is flooded on its observer-side surface with a colored cross-linked polymer, while thereby forming the coloring through which light can shine as a top layer on the observer-side surface of the substrate. The top layer is then a colored layer through which light can shine on the substrate, on its side facing an observer. As the cross-linked polymer, in particular thermoset, the top layer has a material corresponding to the substrate consisting of a cross-linked polymer, in particular thermoset.

It is particularly advantageous both for the optical properties of the motor vehicle interior element with regard to light shining through it and for the esthetic impression of the motor vehicle interior element for an observer, that is to say often for an occupant of the motor vehicle, in particular its driver, if, according to a development of the invention, the substrate is flooded with the colored cross-linked polymer, in particular thermoset, while thereby forming a colored top layer of a uniform layer thickness on the observer-side surface of the substrate.

According to another advantageous development of the invention, the colored cross-linked polymer, in particular thermoset, forming the top layer is produced by mixing a first top-layer material component and a second top-layer material component, a scratch resistance of the top layer being set by a mixing ratio of the first top layer material component and the second top-layer material component and/or by a selection of the first top-layer material component and the second top-layer material component. In this way, it is already possible with the second step of the method according to the invention to produce at the same time a scratch-resistant surface of the motor vehicle interior element, without requiring an additional, subsequent step, in which the surface would for example be provided with a coating bringing about the scratch resistance. The selection of the first top-layer material component and second top-layer material component comprises for example selecting a specific material pairing of first top-layer material component and second top-layer material component or for example providing an additional additive in at least one of the two components. Scratch resistance may mean on the one hand that the surface has a great hardness, but on the other hand also that the surface has a self-healing effect with respect to scratches, so that possible scratches in the surface repair themselves. In principle, both the aforementioned meanings of scratch resistance are included by the invention.

It could be imagined that the substrate and the top layer are produced from an identical cross-linked polymer, in particular an identical thermoset. The first top-layer material component could then correspond to the first component of the substrate and the second top-layer material component could correspond to the second component of the substrate. By contrast, an advantageous development of the invention provides that the substrate is produced from a first cross-linked polymer, in particular a first thermoset, and that the colored top layer is produced from a second cross-linked polymer, in particular a second thermoset, different from the first cross-linked polymer, in particular thermoset. In this way, for example, a cross-linked polymer, in particular thermoset, with which a best-possible transparency and stability of the support is achieved can be chosen for the substrate, and a cross-linked polymer, in particular thermoset, with which a best-possible scratch resistance and surface quality of the motor vehicle interior element is achieved can be chosen for the top layer.

According to another advantageous development of the invention, the substrate is immersed at least with its observer-side surface into a liquid dye, and the liquid dye forms the coloring through which light can shine. In the case of this development, consequently, in the second step of the method according to the invention a top layer is not formed on the substrate, but instead the substrate itself forms with its observer-side surface also the surface of the motor vehicle interior element. The coloring through which light can shine on the observer-side surface of the substrate is preferably formed by dye molecules of the liquid dye that penetrate into the substrate, for example diffuse into the substrate. The liquid dye is preferably a dye solution. Preferably, the substrate is immersed in the liquid dye while thereby forming a homogeneous coloring at least of the observer-side surface of the substrate. The dye forming the coloring through which light can shine remains on and/or in the substrate after the immersion.

In principle, it may be provided that the entire surface of the motor vehicle interior element is provided throughout with the coloring through which light can shine, thereby forming a uniform surface of the element. By contrast, according to another advantageous development of the invention, during the flooding with the colored cross-linked polymer, in particular thermoset, or during the immersion in the liquid dye, the substrate is masked in at least a subregion of the flooded or immersed surface of the substrate. For example, such a masked subregion may be intended for an indicating element or indicating symbol in the motor vehicle interior element that is to be made especially prominent, or the masked subregion may for example be provided with a coloring through which light cannot shine in order to prevent light from undesirably shining through the motor vehicle interior element in this region. Also for example subregions with and without a disappearance effect and/or subregions of different brightnesses and/or subregions of different colors may be formed by means of a masking.

According to another advantageous development of the invention, a side of the substrate facing away from an observer, in particular a rear-side surface of the substrate, is connected to an indicating device in an optical bonding method step. The optical bonding method step preferably comprises connecting the substrate and the indicating device by means of an optical bonding material. In this case, a gap between the indicating device and the substrate is filled by means of the optical bonding material, so that the indicating device and the substrate are firmly connected to one another.

The object mentioned second above is achieved according to the invention by a motor vehicle interior element of the type mentioned at the beginning, wherein the motor vehicle interior element has a three-dimensional transparent substrate of a cross-linked polymer and a colored top layer of a cross-linked polymer, through which light can shine, at least in a subregion, arranged on an observer-side surface of the substrate, as a coloring through which light can shine, or a coloring through which light can shine remaining in the substrate after an immersion at least of the observer-side surface of the substrate in liquid dye.

The motor vehicle interior element is preferably produced by a method according to the invention. The motor vehicle interior element is intended for fitting in a motor vehicle or is already fitted in such a vehicle. In principle, the motor vehicle interior element could for example be generally an interior trim or cockpit fairing of the motor vehicle. Preferably, the motor vehicle interior element is however an operating and/or indicating element. The operating and/or indicating element may for example also be a component part of an aforementioned interior trim or cockpit fairing. For example, the operating and/or indicating element, and consequently the motor vehicle interior element according to the invention, is a component part of an input device, for example a touch-sensitive input device such as a touch-sensitive screen.

The cross-linked polymer of the substrate and/or of the top layer may be for example an elastomer. Preferably, the cross-linked polymer of the substrate and/or of the top layer is a thermoset.

According to an advantageous development of the invention, an indicating device is arranged on a side of the substrate that is facing away from an observer, in particular on a rear-side surface of the substrate. The substrate and the indicating device are preferably connected by means of an optical bonding material, the optical bonding material filling a gap between the substrate and the indicating device, so that the substrate and the indicating device are firmly connected to one another. The indicating device is preferably an electro-optical indicating device. In particular, the indicating device may be a display or a screen.

Exemplary embodiments of the invention are schematically and diagrammatically represented in the drawing and are described in more detail below on the basis of the drawing, in which:

BRIEF DESCRIPTION OF THE FIGURES

In all of the figures, respectively corresponding elements are provided with the same designations.

DETAILED DESCRIPTION

Figure 1A:
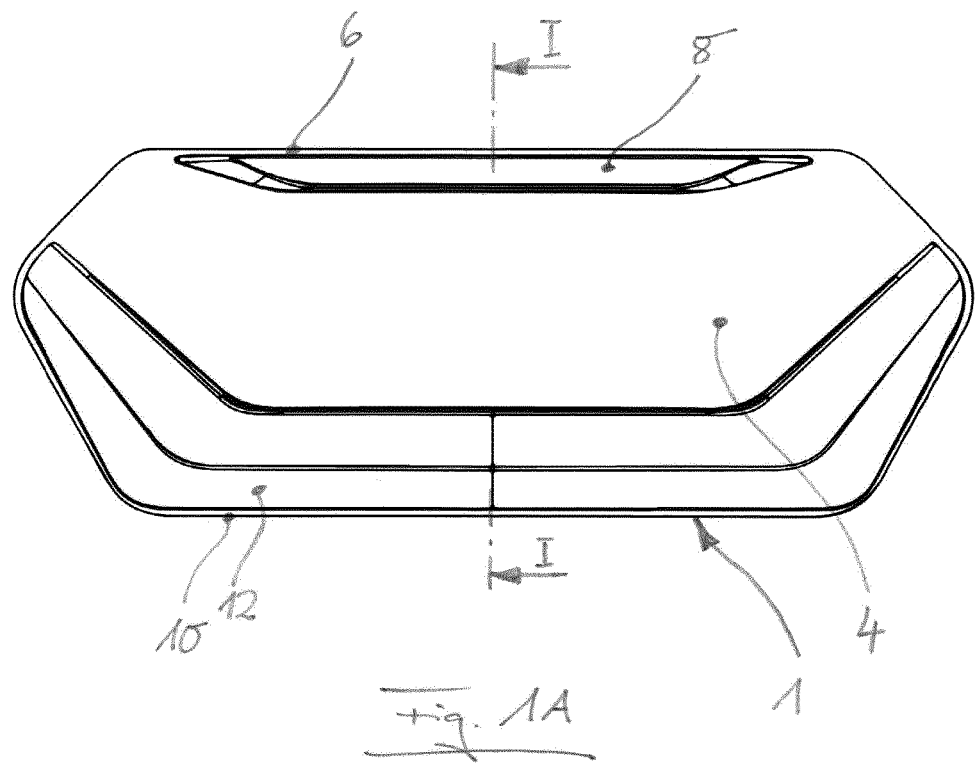
FIG. 1A shows a substrate of a motor vehicle interior element in a plan view.
Figure 2:
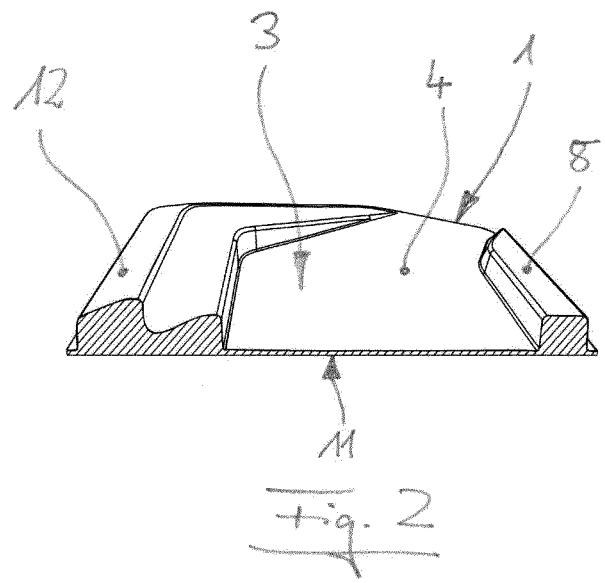
FIG. 2 shows the substrate as shown in FIG. 1A in a sectional view.
Figure 3:
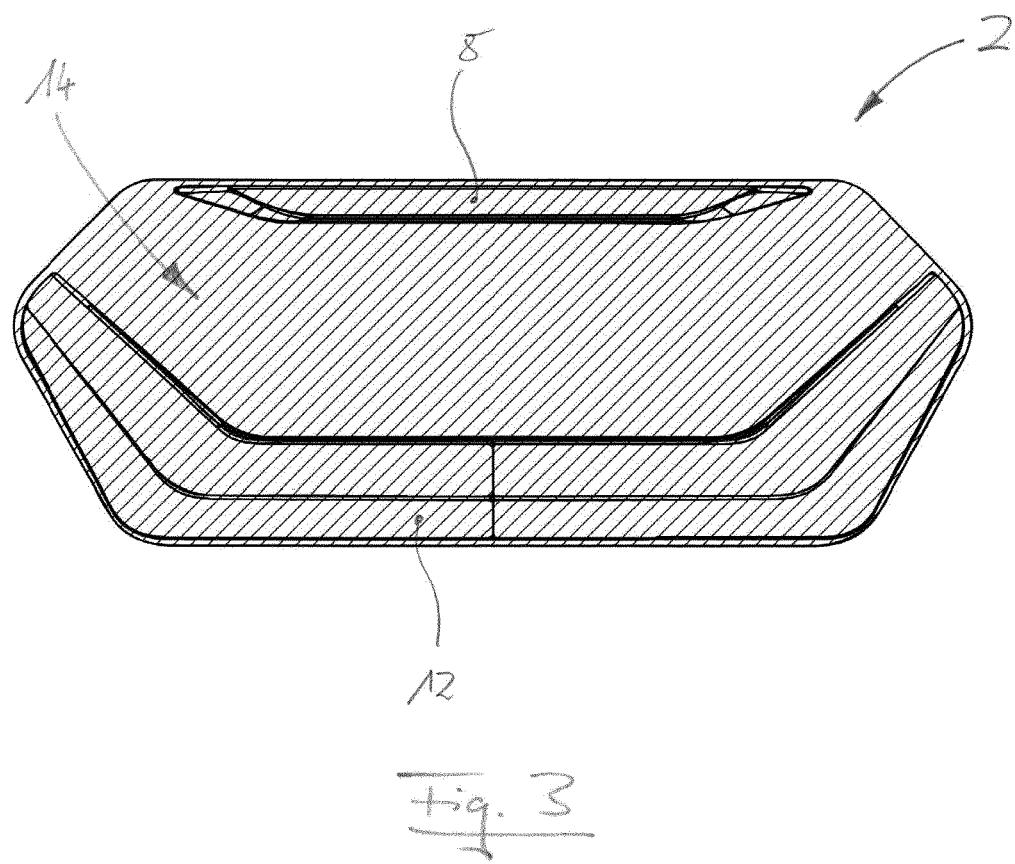
FIG. 3 shows the substrate as shown in FIG. 1A with a coloring in a plan view and FIG. 4 shows a substrate with a display in a sectional view.

FIG. 1A shows a substrate 1 of a motor vehicle interior element 2 in a plan view (see FIG. 3). In the plan view, an observer-side surface 3 (compare FIG. 2) of the substrate 1 can be seen. The viewing direction corresponds here approximately to that of an occupant of the motor vehicle looking at the motor vehicle interior element 2 when it has been fitted in a motor vehicle.

The substrate 1 has been produced as a three-dimensional transparent substrate 1 and generally from a cross-linked polymer, in this exemplary embodiment specifically from a thermoset. To illustrate the three-dimensional form of the substrate 1, it is represented in FIG. 1B in a perspective view, which corresponds to an oblique plan view.

Figure 1B:
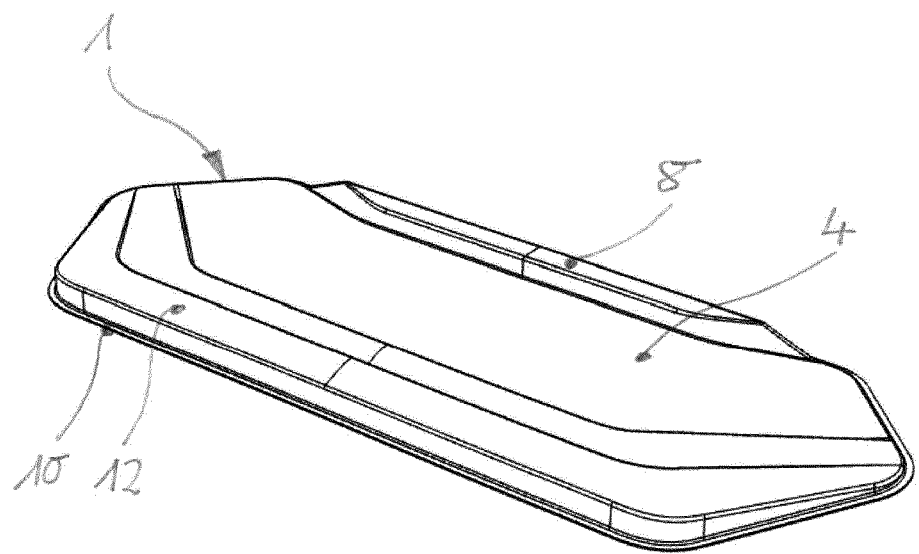
FIG. 1B shows the substrate as shown in FIG. 1A in a perspective view.

It can be seen in FIGS. 1A, 1B that the substrate 1 has a planar central substrate region 4 and, adjoining it in the region of a first longitudinal side 6 of the substrate 1, a first longitudinal elevated substrate region 8. In the region of a second longitudinal side 10 of the substrate 1 opposite the first longitudinal side 6 of the substrate 1, it has a second longitudinal elevated substrate region 12. The substrate 1 is consequently of a plastic form on its observer-side surface 3.

A rear-side surface 11 facing away from an observer (compare FIG. 2) of the substrate 1 is of a planar form.

For further illustration in particular of the three-dimensional, plastic form of the substrate 1, FIG. 2 shows a perspective view of a section of the substrate 1 along a line I-I in FIG. 1A. The substrate 1 represents a one-piece transparent component, produced from one material, specifically a thermoset.

In FIG. 3, the motor vehicle interior element 2 is shown in a plan view, the viewing direction corresponding here approximately to that of an observer, in particular an occupant of a motor vehicle who is looking at the motor vehicle interior element. Consequently, an observer-side surface of the motor vehicle interior element 2 can be seen in FIG. 3. The motor vehicle interior element 2 may for example be an operating and indicating element that is inserted into a recess, for example of a cockpit fairing.

The substrate 1 (see FIGS. 1A, 1B, 2) is provided on its observer-side surface 3 with a coloring 14 through which light can shine, while thereby forming the motor vehicle interior element 2. For example, the substrate 1 is flooded on its observer-side surface 3 with a colored cross-linked polymer, in particular with a colored thermoset, thereby forming the coloring 14 through which light can shine as a top layer on the observer-side surface of the substrate 1. However, the substrate 1 may for example also be immersed at least with its observer-side surface 3 in a liquid dye, so that the liquid dye forms the coloring 14 through which light can shine.

The coloring 14 is of a homogeneous form. With reference to the aforementioned examples, for this either the aforementioned top layer has a uniform, constant layer thickness over the entire observer-side surface 3 of the substrate 1 or the aforementioned liquid dye is distributed uniformly over the observer-side surface 3 of the substrate 1. Consequently, the contour of the motor vehicle interior element 2 corresponds to the contour of the substrate 1, so that the two elevated substrate regions 8, 12 are also formed in a way corresponding to the motor vehicle interior element 2.

In further exemplary embodiments, it is also conceivable that the substrate 1 has the coloring through which light can shine on its entire surface, that is to say on all sides. The substrate 1 is then provided on its entire surface with the top layer forming the coloring through which light can shine or with the dye forming the coloring through which light can shine.

Figure 4:
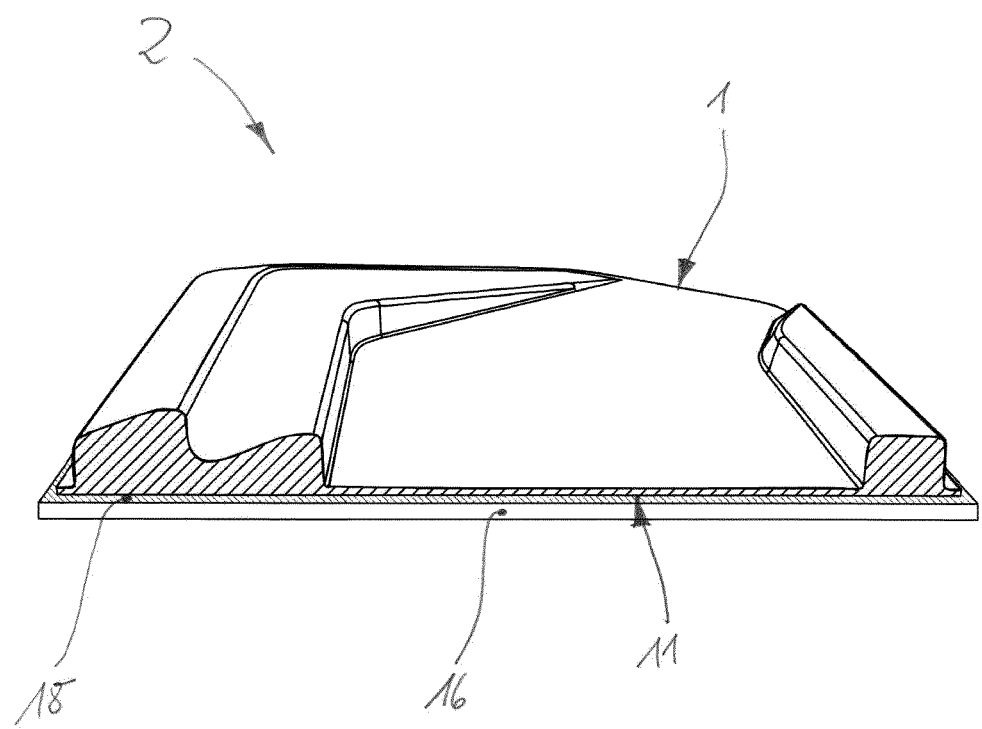

FIG. 4 shows in a perspective view a section of a substrate 1, which corresponds for example to the substrate shown in the previous figures, of a motor vehicle interior element 2. On a side facing away from an observer, here specifically on the rear-side surface 11 of the substrate 1, an indicating device 16 is arranged. The indicating device 16, which in this exemplary embodiment is an electro-optical indicating device 16 and a display, is connected to the substrate 1, to be precise with the rear-side surface 11 thereof, by means of a connecting layer 18 comprising an optical bonding material.

What is claimed is:

1. A method for producing a three-dimensional motor vehicle interior element through which light can shine and which has a rear-side surface and an observer-side surface, the motor vehicle interior element being produced in two steps, the method comprising:

producing a three-dimensional transparent substrate having a first longitudinal elevated substrate region, a planar central region, and a second longitudinal elevated substrate region of the observer-side surface, wherein the substrate is made from a cross-linked polymer; and providing in at least a subregion, a coloring on an observer-side surface of the substrate through which light can shine.

2. The method of claim 1, wherein the substrate is produced by mixing a first component and a second component.

3. The method of claim 2, wherein the first component is a polyol and the second component is an aliphatic polyisocyanate, wherein the cross-linked polymer is a polyurethane produced by a reaction of the polyol and the polyisocyanate.

4. The method of claim 3, wherein the substrate is flooded on the observer-side surface with a colored, cross-linked polymer, thereby forming the coloring through which light can shine as a top layer on the observer-side surface of the substrate.

5. The method of claim 4, wherein the substrate is flooded with the colored cross-linked polymer thereby forming a colored, top layer of a uniform layer thickness on the observer-side surface of the substrate.

6. The method of claim 5, wherein the colored, cross-linked polymer forming the top layer is produced by mixing a first top-layer material component and a second top-layer material component, a scratch resistance of the top layer being set by a mixing ratio of the first top-layer material component and the second top-layer material component and/or by a selection of the first top-layer material component and the second top-layer material component.

7. The method of claim 6, wherein the substrate is produced from a first cross-linked polymer and the colored top layer is produced from a second cross-linked polymer different from the first cross-linked polymer.

8. The method of claim 7, wherein the substrate is immersed at least with the observer-side surface into a liquid dye and in that the liquid dye forms the coloring through which light can shine.

9. The method of claim 8, wherein during the flooding with the colored cross-linked polymer the substrate is masked in at least a subregion of the flooded surface of the substrate.

10. The method of claim 9, wherein a side of the substrate facing away from an observer is connected to an indicating device in an optical bonding method step.

11. A motor vehicle interior element, the motor vehicle interior element comprising: a three-dimensional transparent substrate having a rear-side surface and an observer-side surface comprising a first longitudinal elevated substrate region, a planar central region, and a second longitudinal elevated substrate region, wherein the substrate is made of a cross-linked polymer and wherein the observer-side surface of the substrate has a colored top layer made of a cross-linked polymer in at least a subregion after an immersion of at least the observer-side surface of the substrate in liquid dye, wherein light can shine through the colored top layer.

12. The motor vehicle interior element of claim 11, wherein an indicating device is arranged on a side of the substrate that is facing away from an observer.

\* \* \* \* \*